United States Patent
Ramdass

(10) Patent No.: US 9,771,023 B2
(45) Date of Patent: Sep. 26, 2017

(54) EMERGENCY LIGHT MODULE FOR MOTOR VEHICLES

(71) Applicant: Peter D. Ramdass, Rosedale, NY (US)

(72) Inventor: Peter D. Ramdass, Rosedale, NY (US)

( * ) Notice: Subject to any disclaimer, the term of this patent is extended or adjusted under 35 U.S.C. 154(b) by 24 days.

(21) Appl. No.: 15/064,375

(22) Filed: Mar. 8, 2016

(65) Prior Publication Data

US 2017/0174127 A1 Jun. 22, 2017

Related U.S. Application Data

(60) Provisional application No. 62/270,298, filed on Dec. 21, 2015.

(51) Int. Cl.
| | |
|---|---|
| *F21V 7/00* | (2006.01) |
| *B60Q 11/00* | (2006.01) |
| *F21S 8/10* | (2006.01) |
| *B60Q 1/00* | (2006.01) |

(52) U.S. Cl.
CPC .......... *B60Q 11/002* (2013.01); *B60Q 1/0076* (2013.01); *F21S 48/115* (2013.01); *F21S 48/1208* (2013.01); *F21S 48/1341* (2013.01)

(58) Field of Classification Search
CPC .... B60Q 11/002; B60Q 1/0076; F21S 48/115; F21S 48/1341; F21S 48/1208
USPC ........................ 362/516, 517, 519, 543, 243
See application file for complete search history.

(56) References Cited

U.S. PATENT DOCUMENTS

| | | | |
|---|---|---|---|
| 5,797,672 | A | 8/1998 | Dobert |
| 6,149,283 | A | 11/2000 | Conway et al. |
| 6,756,893 | B1 | 6/2004 | Fernandez |
| 8,585,233 | B1 | 11/2013 | Torres |
| 2006/0268565 | A1 | 11/2006 | Chang |
| 2008/0122608 | A1 | 5/2008 | Plummer et al. |

*Primary Examiner* — Vip Patel

(74) *Attorney, Agent, or Firm* — Lawrence G. Fridman, Esq.; Feigin & Fridman, LLC

(57) ABSTRACT

A combination of headlight assembly and an emergency light module consists of a light module and a lighting cavity having a reflector with a light emitting source. A headlight assembly comprises a reflecting portion and a lens member. The reflector is connected to the external area of the lens, so that the light source faces the headlight reflector, wherein the light generated by the light emitting source is directed through the lens into the interior of the headlight assembly and is reflected back from the reflector utilizing its reflective properties passing though the body of the lens illuminating area outside the motor vehicle, so that working condition of the vehicle headlight light is simulated.

11 Claims, 3 Drawing Sheets

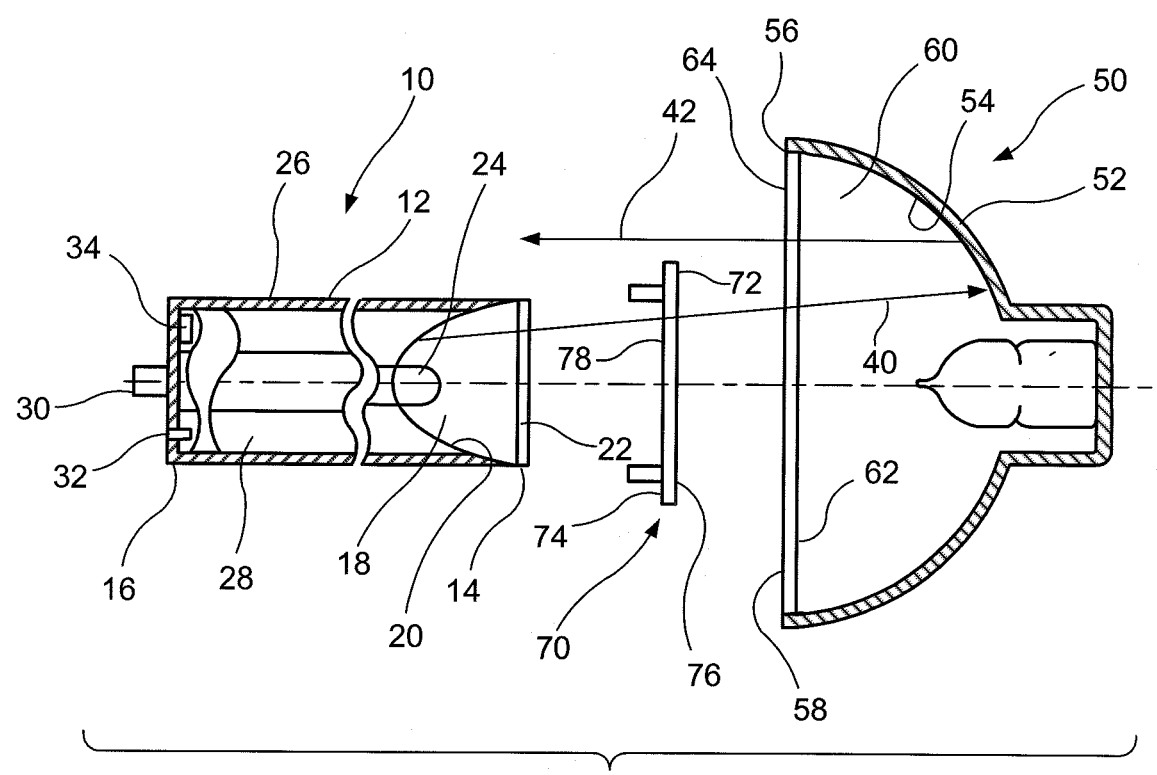
F I G. 1

EMERGENCY LIGHT MODULE FOR MOTOR VEHICLES

REFERENCE TO RELATED APPLICATIONS

This Application claims priority of U.S. Provisional Application Ser. No. 62/270,298 filed by the inventor on Dec. 21, 2015, the entire disclosure of which is hereby incorporated by reference.

FIELD OF THE INVENTION

The present invention relates to vehicle headlights in general, more particularly, the invention relates to equipment for temporary and emergency use with inoperable headlights.

BACKGROUND OF THE INVENTION

Headlights are essential for safe operation of vehicles, especially when driving at night. Properly operated headlights enable a driver to see the road, and are also essential for other drivers to observe the vehicle. Thus, properly operating headlights represent an essential safety feature of a motor vehicle, especially when driving at night.

However, failed or malfunctioning headlights are a matter of common occurrence, preventing and delaying safe operation of a motor vehicle. Because of the importance to safety, repair on the malfunctioning headlights must be carried out on a top priority basis. But this is not always possible, especially when a vehicle is away from a repair facility or at night when such facilities are closed.

Prior art discloses arrangements for performing some functions of a broken headlights as emergency occurs. However, such prior art arrangements are typically complicated, expensive and often substantial labor steps are required in order to establish their functionality. For example, U.S. Pat. No. 8,585,233 to Torres discloses a temporary emergency replacement for a motor vehicle headlight bulb. One of the major drawbacks of the Torres disclosure is that a body of a tapered design having large exterior threads must be screwed into the headlight bulb socket of a motor vehicle after a non-operational headlight bulb is removed. Operation of the Torres device require substantial labor manipulation by means of disassembly of the malfunctioning headlight through the removal of the exterior lens, unscrewing and removing the broken headlight bulb, screwing the device into the headlight bulb socket, etc. These labor steps are quite difficult to perform in the emergency circumstances.

Thus it has been long felt and unsolved need for a simple and economical, temporary device enabling a non-operating motor vehicle headlight to function until fixed. There is also a need for a temporary device which can be utilized by a common user in a simple and effortless manner with little or no training, the device which does not require tools and disassembly of the broken headlight prior to installation.

SUMMARY OF THE INVENTION

One aspect of the invention provides an emergency headlight module for a motor vehicle comprising a housing extending between proximal and distal ends thereof. A lighting cavity having a concave reflector and a light emitting source are formed at the distal end. The module is used in combination with a headlight assembly formed with a concaved reflecting portion and a lens member secured at the forward portion of the reflector. A body of the lens extends between external and internal areas. An essential aspect of the invention is that no disassembly of the headlight is required prior to installation of the module. More specifically, in use the proximal end of the housing of the module is connected to the external area of the lens, so that the light emitting source faces the headlight reflector. The light generated by the light emitting source is directed through the body of the lens into the interior of the headlight assembly and is reflected back from the reflector utilizing its reflective properties passing through the body of the lens and illuminating area outside of the motor vehicle. In this manner, working condition of the headlight is simulated.

Another aspect of the invention provides a combination of a headlight assembly of a motor vehicle and the above-discussed emergency light module. Prior to the use of the combination of the invention no disassembly of the vehicle headlight is required.

The module is connected to the exterior lens of the malfunctioning light of a motor vehicle in such a manner that light emitting source faces the reflector of the light fixture. The light generated by the light emitting source is directed through the exterior lens into the interior of the malfunctioning light fixture and is reflected back from the reflector utilizing its reflective purposes in passing through the body of the exterior lens illuminating an area outside of the motor vehicle and simulating working condition of the headlight.

A further aspect of the invention provides an emergency kit for modifying a headlight of a motor vehicle. The headlight includes a reflecting portion and a lens member provided at the forward portion of the reflector. In the use of the kit no disassembly of the headlight is required prior to installation of the module. The lens is formed having a body with external and internal areas, an interior of the headlight is formed between the internal area of the lens the concaved reflecting surface. The kit further comprises a light module having a housing extending between proximal and distal ends thereof. A lighting cavity consists of a concave reflector with a light emitting source provided in the cavity at the distal end of the module. An attachment arrangement attaches the distal end of the module to the lens of the headlight. The proximal end of the housing is connected to the external area of the lens by the attachment arrangement, so that the light emitting source faces the headlight reflector, the light generated by the light emitting source is directed through the body of the lens into the interior of the headlight and is reflected back from the reflector through the body of the lens.

BRIEF DESCRIPTION OF THE DRAWINGS

Referring now to the drawings which are provided to illustrate and not to limit the invention, wherein:

FIG. 1 is an exploded view showing a combination of an emergency light module and a headlight assembly of a motor vehicle;

DETAILED DESCRIPTION OF THE INVENTION

Figure 2:
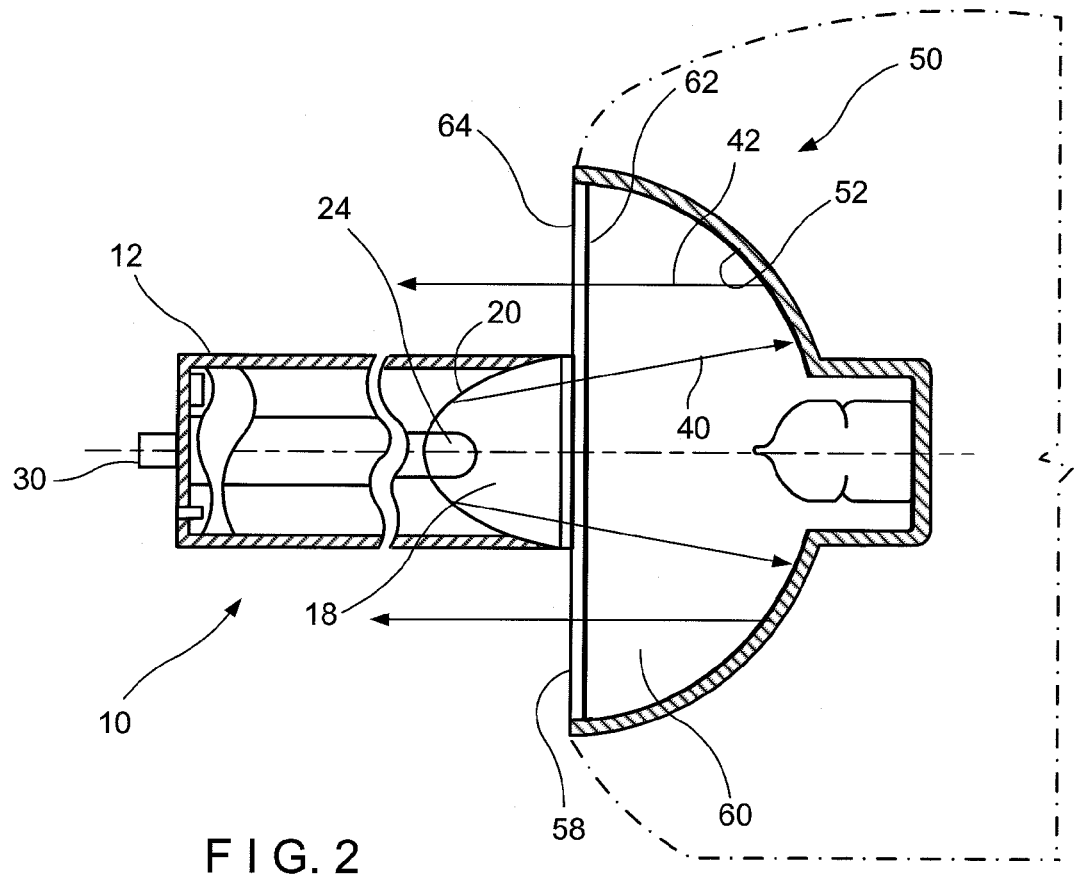
FIG. 2 is a view showing the emergency light module mounted at the headlight of the vehicle.
Figure 3:
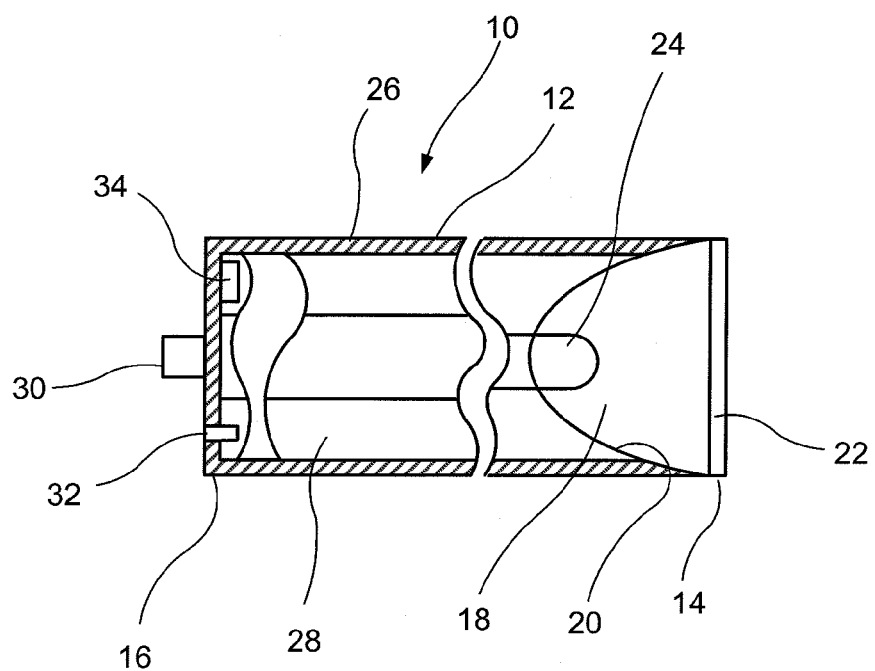
FIG. 3 is a partial sectional view of the emergency light module of the invention.

We refer now to various Figures of the drawings illustrating an emergency light module 10 of the invention and its use in combination with a headlight fixture 50 of a motor vehicle. The light module 10 is formed with a waterproof housing 12 extending between proximal 14 and distal 16 ends thereof. A lighting cavity 18 having a concaved reflector 20 is provided at the distal end. A forward lens 22 is secured at the distal end forming the lighting cavity. The reflector 20 defines a protruding rear portion having an aperture therein. The cavity further includes a light emitting source 24 located substantially within the aperture of the reflector and extending forwardly within the lighting cavity 18 relative to the reflector 20. Although the preferred embodiment of the invention is being described with the light emitting source 24 in the form of high intensity LED module beneficially mounted in the cavity 18, it should be understood that any conventional light sources, such as for example light bulbs, etc. are within the scope of the invention.

A battery compartment 26 is located at the proximal end of the housing and includes an internal volume 28 that is sufficient to store several regular or rechargeable batteries, which can provide several hours of operating time. Preferably, the batteries can be a plurality of nickel metal hydride (NiMH) or lithium ion rechargeable batteries known to one of ordinary skill in the art. An additional battery set having a magnetic base can be also provided. Operation of the module 10 is controlled by a user by means of an ON/OFF switch 30 that is located toward the rear of the battery compartment. A charging port 32 is formed at the proximal end of the housing. From the ON/OFF switch 30 power is applied to an LED driver assembly 34 also disposed in the battery compartment.

The LED driver assembly applies controlled power to the light emitting source or the high intensity LED module. The batteries can be recharged through the use a cigarette lighter port or other parts of the vehicle electrical system.

The light module 10 is provided for emergency use in combination with a malfunctioning headlight fixture 50 of a motor vehicle illustrated in FIGS. 1 and 2. The headlight fixture includes a reflector 52 with a reflecting portion 54 forming an opening 56 at the front area thereof. A lens member 58 is secured across the front portion of the reflector's opening 56 to provide a closure for the lens reflector assembly and also establishing its interior area 60. A body of the lens member 58 is formed with an interior area 62 facing the reflecting portion and an exterior area 64 facing outside of the headlight fixture 50 and the vehicle.

The housing 26 including the lighting cavity 18 and the battery compartment 28, can be constructed of high impact resistant plastic in an injection molding process. On the other hand use of any suitable material is also within the scope of the invention. The LED driver assembly and the charging regulator circuit are designed to produce the necessary illumination levels given the power and time operating requirements.

The module 10 is mountable on the vehicle headlight fixture 50 by a variety of suitable methods. For this purpose an attachment arrangement 70 is provided at outer periphery of the module distal end. One essential function of the attachment arrangement is to assure a reliable connection between the module and the vehicle headlight assembly to withstand intervening factors such as shocks, wind, etc. On the other hand, the attachment arrangement 60 should enable a user to remove the module 10 promptly after an emergency situation ceases to exist, without damage to the headlight lens. As illustrated in FIG. 1, in one embodiment the attachment arrangement 70 is an intermediate adapter 72 having a rear portion 74 provided for receiving the distal end 14 of the module 10 and a front portion 76 provided for connection to the exterior area 64 of the vehicle lens 58. The front portion 76 is substantially flat, with the rear portion extending outwardly therefrom to define a receiving space 78 formed to accept the distal end 14 of the module. The front portion 76 of the intermediate adapter 72 is removably attached to the lens by any suitable means, including an adhesive, to provide a stable connection between the distal end 14 of the module and the exterior area 64 of the lens. As illustrated in FIG. 2, the module 10 can be mounted on the headlight fixture 50 by means of an adhesive, without the use of the adapter. In a further embodiment (not illustrated), the attachment arrangement can include a pad having opposite sides which are covered with a pressure sensitive or heat sensitive material. A removable cover which is detached immediately before the module is to be used, in turn, covers this material.

As illustrated in FIGS. 1 and 2 in use. the distal end 14 of the emergency light module is connected by the attachment arrangement 70 to the lens exterior area 64 of a malfunctioning light fixture of a motor vehicle. In this position the light emitting source 24 faces the reflector 52 of the light fixture. As the switch 30 is turned on, the module produces light 40 which emanates from the light emitting source 24 and is directed through the body of the vehicle lens 58 into the interior 60 of the malfunctioning fixture and is reflected back from the vehicle reflector 52, utilizing its reflective properties. The reflected light 42 passes through the body of the lens 64, so that an area outside of the malfunctioning light fixture is illuminated and functionality of the headlight fixture is simulated. It should be clear to a person of ordinary skill in the present art that no disassembly of the headlight fixture 50 is required prior to installation of the module 10 of the invention.

According to the method of the invention, a user should first clean the exterior area 64 of the headlight lens 58. When the intermediate flange 62 (see FIG. 1) is utilized, the user next attaches the front portion 76 of the flange to the exterior area 64 of the lens, and inserts the distal end 14 of the module into the receiving space 78. In this position, the light emitting unit 24 projects from the reflector 20 forwardly in the direction of the vehicle headlight 50. Then the ON/OFF switch 30 is turned to ON position to generate high intensity light 40. The light 42 reflected from the vehicle reflector 52 passes through the body of the lens 64, so that an area outside of the malfunctioning light fixture is illuminated. When emergency situation ceases to exist, the user will then remove the emergency module 10 of the invention from its engagement with the lens 58, (including the intermediate flange, if applicable), so that the malfunctioning headlight fixture can be repaired. The rechargeable batteries will then be charged for an adequate period of time, envisioned as being several hours. Following an adequate charging time, the headlight module 10 is ready for a future use and it can be safely stored in a motor vehicle for use as required.

The invention is also envisioned for use as an emergency kit for modifying a headlight of a motor vehicle. The kit includes the emergency light module 10 and the attachment arrangement 60 as discussed above, so that these items can be distributed together in one package.

Figure 4:
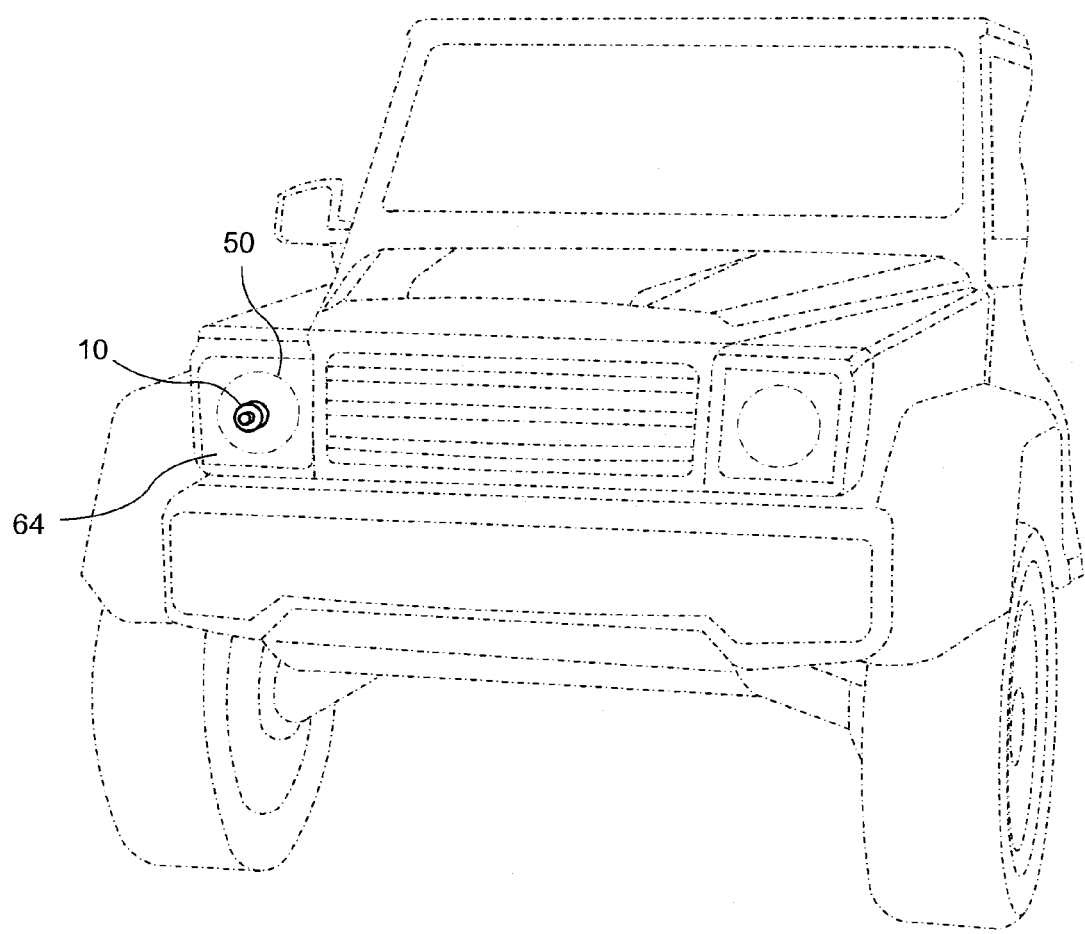
FIG. 4 is a view showing a motor vehicle with the emergency light module mounted on the headlight.

As illustrated in FIG. 4, the emergency module 10 is adapted for use on a motor vehicle, depicted as a passenger car. However, it can be effectively used on any type of motor vehicles including sport utility vehicles, vans, pickup trucks, buses, tractor-trailer rigs, emergency vehicles, or the like.

Although the invention has been described with reference to a particular arrangement of parts, features and the like, these are not intended to exhaust all possible arrangements or features, and indeed many other modifications and variations will be ascertainable to those of skill in the art. For example, the module 10 has been described for use in combination with a headlight of motor vehicles. However, it may also be used as a conventional flashlight by grasping the housing by one's hand around the battery compartment 26 and aiming the distal end 14 with the lighting cavity at an object to provide illumination. Such versatility makes the module 10 applicable for other applications, such as for example carrying in many motor vehicles to provide the flashlight functionality.

It has been discussed above that the invention provides an emergency light module 10 for connection to an exterior lens of a malfunctioning light fixture of a motor vehicle. The module 10 is simple, economical and can be utilized by a common user in an effortless manner with little or no training. Beneficially to the users the module 10 does not require disassembly of the broken headlight fixture prior to installation. When the module is installed, the light emitting source faces the reflector of the light fixture. The light generated by the emitting source is directed through the exterior lens into the interior of the malfunctioning fixture and is reflected back from the reflector utilizing its reflective properties, so that the functionality of light fixture is simulated.

Other styles and configurations of the emergency light module invention can be easily incorporated into the teachings of the present invention. While only one particular configuration is shown and described that is for purposes of clarity and disclosure and not by way of limitation of scope.

What is claimed is:

1. A headlight assembly of a motor vehicle and an emergency light module in combination, comprising:
   a light module comprises a housing extending between proximal and distal ends thereof, a lighting cavity having a concave reflector with a light emitting source at the distal end;
   the headlight assembly comprises a concaved reflecting portion having an opening at a front portion thereof, a lens member secured to the reflector's forward portion to provide a closure for the assembly, the lens is formed having a body with external and internal areas, an interior of the assembly is formed between the internal area of the lens and the concaved reflecting surface;
   said proximal end of the housing being detachably connected to the external area of the lens, in such a manner the light emitting source faces the headlight reflector, wherein the light generated by the light emitting source is directed through the body of the lens into the interior of the headlight assembly and is reflected back from the reflector utilizing its reflective properties passing though the body of the lens illuminating area outside the motor vehicle, so that working condition of the headlight light is simulated;
   an emergency light module provided for connection to an exterior lens of a malfunctioning light fixture of an automobile, in such a manner that the light emitting source faces the reflector of the light fixture, so that the light generated by the light source is directed through the exterior lens into the interior of the malfunctioning fixture and is reflected back from the reflector utilizing its reflective properties passing through the exterior lens, so that functionality of the light fixture is simulated.

2. The combination of claim 1, wherein the light emitting source is LED module producing the light of high intensity.

3. The combination of claim 1, wherein a battery compartment is located at the proximal end of the housing.

4. The combination of claim 1, wherein an on/off switch is provided at a rear part of the battery compartment, so as to control operation of the module by a user.

5. The combination of claim 2, further comprising an LED driver assembly provided at the battery compartment.

6. The combination of claim 1, wherein the light generated by the light emitting source is directed through the body of the lens into the interior of the headlight assembly and is reflected back from the reflector utilizing its reflective properties passing though the interior and exterior areas the body of the lens.

7. An emergency kit for modifying a headlight of a motor vehicle, wherein the headlight comprises a concaved reflecting portion and a lens member provided at the forward portion of the reflector, the lens is formed having a body with external and internal areas, an interior of the headlight is formed between the internal area of the lens the concaved reflecting surface, the kit comprising:
   a light module having a housing extending between proximal and distal ends thereof;
   a lighting cavity having a concave reflector with a light emitting source provided in the cavity at the distal end of the module; and
   an attachment arrangement for attaching the distal end of the module to the lens of the headlight;
   wherein the proximal end of the housing is connected to the external area of the lens by the attachment arrangement, so that the light emitting source faces the headlight reflector, the light generated by the light emitting source is directed through the body of the lens into the interior of the headlight and is reflected back from the reflector through the body of the lens illuminating area outside of the motor vehicle.

8. The emergency kit of claim 7, wherein the light emitting source is LED module producing the light of high intensity.

9. The emergency kit of claim 7, wherein a battery compartment is located at the proximal end of the housing.

10. The emergency kit of claim 7, wherein an on/off switch is provided at a rear part of the battery compartment, so as to control operation of the module by a user.

11. The emergency kit of claim 8, further comprising an LED driver assembly provided at the battery compartment.

* * * * *